(12) United States Patent
Vinogradov et al.

(10) Patent No.: US 8,978,982 B2
(45) Date of Patent: Mar. 17, 2015

(54) AIMING SYSTEM FOR IMAGING SCANNER

(75) Inventors: Igor Vinogradov, Oakdale, NY (US); Edward D. Barkan, Miller Place, NY (US); Mark E. Drzymala, St. James, NY (US); David T. Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/527,082

(22) Filed: Jun. 19, 2012

(65) Prior Publication Data

US 2013/0334314 A1    Dec. 19, 2013

(51) Int. Cl.
G06K 7/10     (2006.01)
G06K 9/24     (2006.01)
G02B 5/08     (2006.01)
G06K 7/14     (2006.01)

(52) U.S. Cl.
CPC .. *G06K 7/10* (2013.01); *G06K 7/14* (2013.01); *G06K 7/10821* (2013.01); *G06K 7/10564* (2013.01); *G06K 7/10881* (2013.01); *G06K 7/10584* (2013.01); *G06K 7/10801* (2013.01); *G06K 7/10732* (2013.01); *G06K 7/10574* (2013.01); *G06K 7/10722* (2013.01)
USPC ............. 235/462.21; 235/462.11; 235/462.36

(58) Field of Classification Search
CPC ............ G06K 2207/1011; G06K 7/14; G06K 7/10564; G06K 7/10574; G06K 7/10722; G06K 7/10732; G06K 7/10801; G06K 7/10831; G06K 7/10881
USPC ........................... 235/462.11, 462.21, 462.36
See application file for complete search history.

(56) References Cited

U.S. PATENT DOCUMENTS

| 3,602,037 | A | * | 8/1971 | Neu .................................. 73/651 |
| 4,502,762 | A | * | 3/1985 | Anderson ................ 359/485.03 |
| 4,723,160 | A | | 2/1988 | Connelly |
| 4,877,949 | A | * | 10/1989 | Danielson et al. ....... 235/462.21 |
| 5,390,210 | A | * | 2/1995 | Fouquet et al. ................. 372/92 |
| 5,576,529 | A | | 11/1996 | Koenck et al. |
| 5,783,811 | A | * | 7/1998 | Feng et al. ............... 235/462.42 |
| 5,836,694 | A | | 11/1998 | Nguyen |
| 6,000,617 | A | * | 12/1999 | Swartz et al. ............... 235/462.2 |
| 6,060,722 | A | | 5/2000 | Havens et al. |
| 6,981,642 | B2 | * | 1/2006 | Krichever ..................... 235/454 |
| 2005/0035205 | A1 | * | 2/2005 | Li ............................. 235/462.21 |

(Continued)

OTHER PUBLICATIONS

Definition of "Close" from Merriam-Webster Online Dictionary, http://www.merriam-webster.com/dictionary/close.*

(Continued)

*Primary Examiner* — Thien M Le
*Assistant Examiner* — Claude J Brown
(74) *Attorney, Agent, or Firm* — Nong-Qiang Fan

(57) ABSTRACT

An apparatus includes (1) an imaging lens arrangement having an optical axis, (2) an aiming light source configured to project visible light through the imaging lens arrangement to create an aiming pattern on a target object, (3) an imaging sensor detecting light from the target object through the imaging lens arrangement, and (4) a folding mirror tilted relative to the optical axis of the imaging lens arrangement. The folding mirror is positioned both on the optical path from the imaging lens arrangement to the imaging sensor and on the optical path from the aiming light source to the imaging lens arrangement. Both the imaging arrangement and the aiming arrangement share the same imaging lens.

28 Claims, 11 Drawing Sheets

(56) References Cited

U.S. PATENT DOCUMENTS

| | | | |
|---|---|---|---|
| 2005/0284942 A1* | 12/2005 | Gurevich et al. | 235/462.21 |
| 2006/0081712 A1 | 4/2006 | Rudeen et al. | |
| 2006/0097053 A1* | 5/2006 | Jolivet et al. | 235/462.36 |
| 2008/0290169 A1* | 11/2008 | Gurevich et al. | 235/462.2 |
| 2009/0277963 A1* | 11/2009 | Van Kerkhoven et al. | 235/462.21 |
| 2010/0054545 A1* | 3/2010 | Elliott | 382/115 |
| 2010/0270376 A1* | 10/2010 | McQueen | 235/462.11 |
| 2010/0327067 A1* | 12/2010 | Drzymala et al. | 235/462.2 |
| 2012/0097744 A1 | 4/2012 | Drzymala et al. | |
| 2012/0181338 A1* | 7/2012 | Gao | 235/455 |

OTHER PUBLICATIONS

Definition of "Most" from Merriam-Webster Online Dictionary, http://www.merriam-webster.com/dictionary/most.*
Definition of "Majority" from Merriam-Webster Online Dictionary, http://www.merriam-webster.com/dictionary/majority.*
International Search Report and Written Opinion in counterpart application PCT/US2013/041331 mailed Aug. 30, 2013.

* cited by examiner

US 8,978,982 B2

AIMING SYSTEM FOR IMAGING SCANNER

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces have differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

SUMMARY

In one aspect, the invention is directed to an apparatus. The apparatus includes (1) an imaging lens arrangement having an optical axis, (2) an aiming light source configured to project visible light through the imaging lens arrangement to create an aiming pattern on a target object, (3) an illumination light source operative to generate an illumination light projected towards a barcode on the target object, (4) an imaging sensor having photosensitive elements configured to detect light from the target object through the imaging lens arrangement to sample the image by sensor's pixels when the illumination light is projected towards the barcode on the target object, and a folding mirror tilted with an angle between 30 to 60 degrees relative to the optical axis of the imaging lens arrangement. The folding mirror is positioned both on the optical path of the imaging lens arrangement and the imaging sensor and on the optical path of the aiming light source and the imaging lens arrangement.

In one aspect, the invention is directed to a method. The method includes: (1) transmitting visible light from an aiming light source through a folding mirror and through an imaging lens arrangement sequentially to project an aiming pattern onto a target object; (2) projecting an illumination light towards a barcode on the target object; (3) transmitting light from the target object through the imaging lens arrangement to cause light from the target object being incident upon the folding mirror; (4) reflecting the light that is incident upon the folding mirror onto an imaging sensor having photosensitive elements to create imaging data; and (5) processing the imaging data to decode an image of the barcode. The folding mirror is tilted relative to an optical axis of the imaging lens arrangement.

In one aspect, the invention is directed to a method. The methods includes: (1) reflecting visible light from an aiming light source into an imaging lens arrangement with a folding mirror to project an aiming pattern onto a target object; (2) projecting an illumination light towards a barcode on the target object; (3) transmitting light from the target object through the imaging lens arrangement and through the folding mirror sequentially to cause light from the target object being incident upon an imaging sensor having photosensitive elements to create imaging data; and (4) processing the imaging data to decode an image of the barcode. The folding mirror is tilted relative to an optical axis of the imaging lens arrangement.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
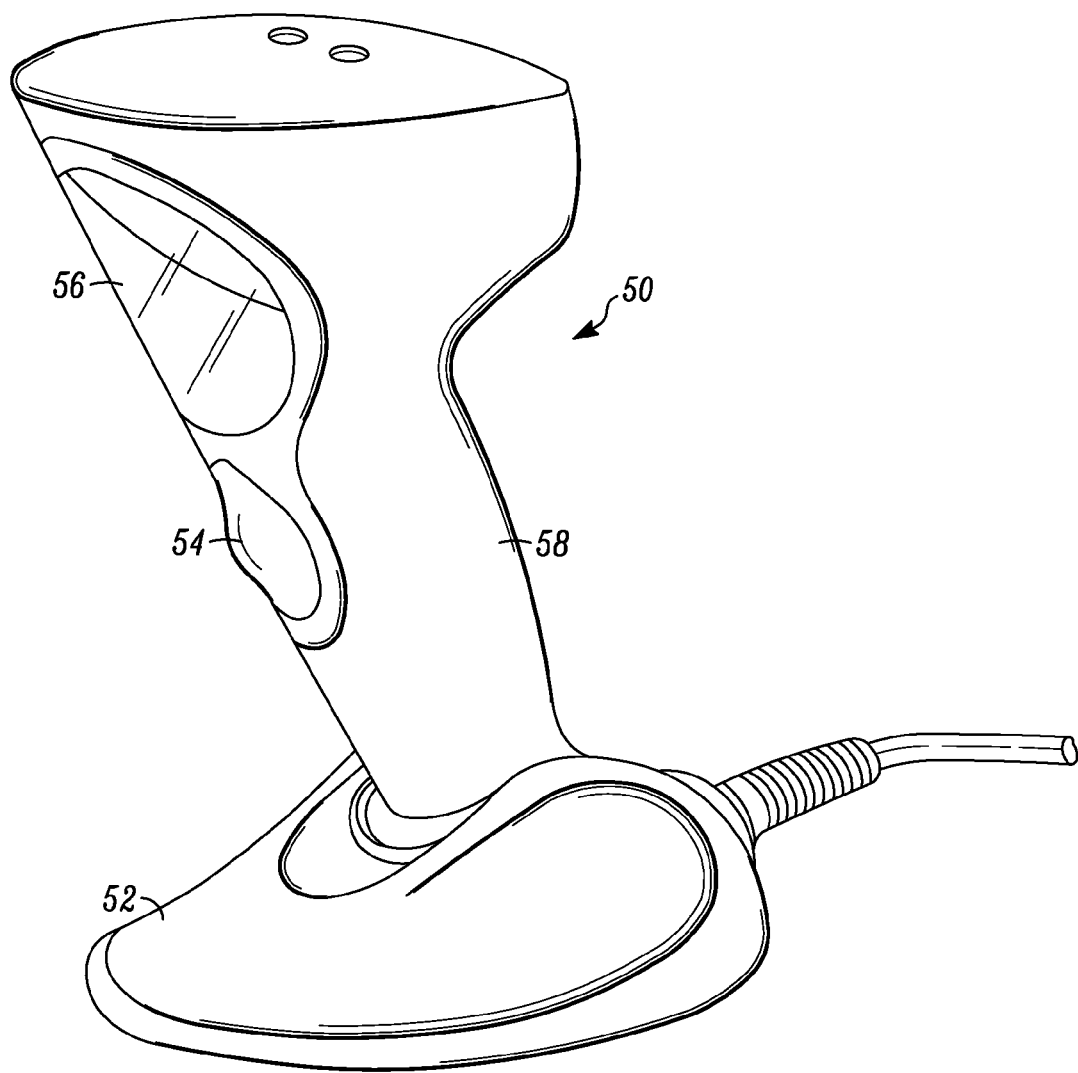
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present inven-

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
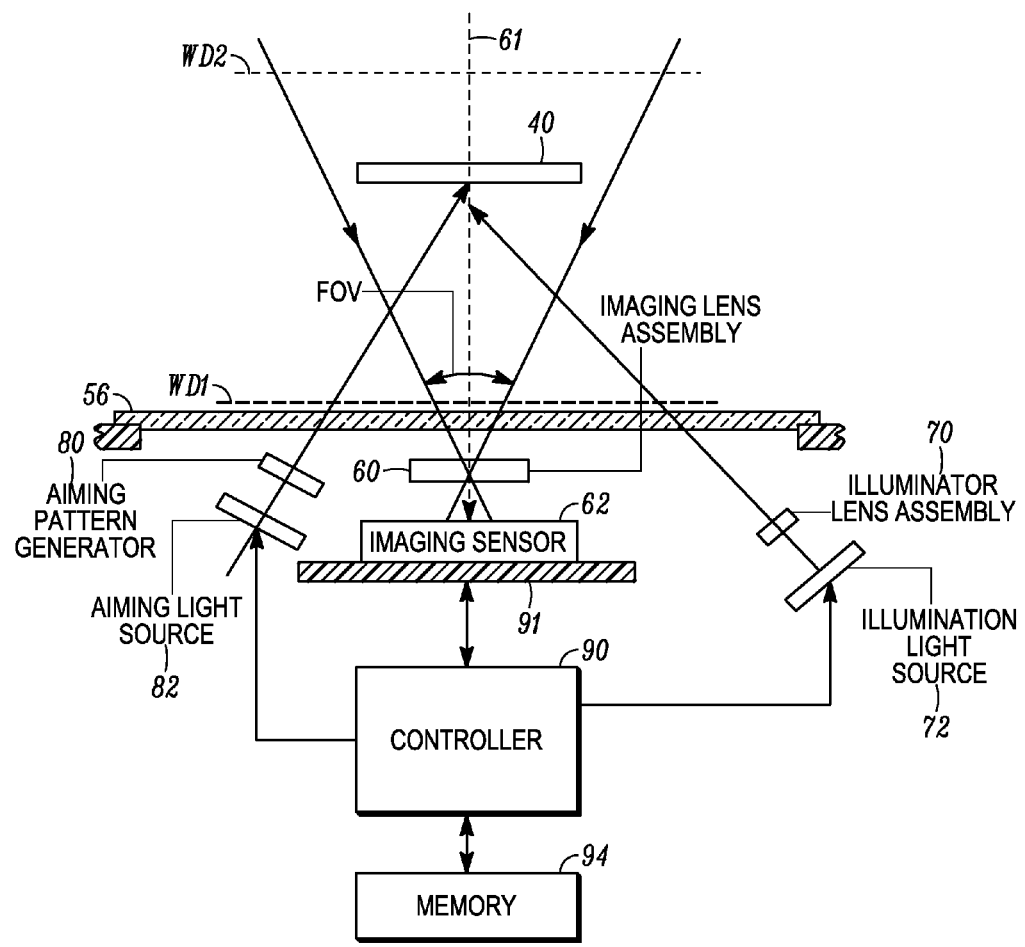
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination light source 72; (3) an aiming pattern generator 80 positioned in front of an aiming light source 82; and (4) a controller 90. In FIG. 2, the imaging lens arrangement 60, the illuminating lens arrangement 70, and the aiming pattern generator 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as imaging data over a two-dimensional imaging field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 60. Some of the imaging scanners can include an auto-focus system to enable a barcode be more clearly imaged with the imaging sensor 62 based on the measured distance of this barcode. In some implementations of the auto-focus system, the focus length of the imaging lens arrangement 60 is adjusted based on the measured distance of the barcode. In some other implementations of the auto-focus system, the distance between the imaging lens arrangement 60 and the imaging sensor 62 is adjusted based on the measured distance of the barcode.

In FIG. 2, the illuminating lens arrangement 70 and the illumination light source 72 are designed to operate together for generating an illuminating light towards the barcode 40 during an illumination time period. The illumination light source 72 can include one or more light emitting diodes (LED). The illumination light source 72 can also include a laser or other kind of light sources. The aiming pattern generator 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination light source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the imaging field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination light source 72 for a predetermined illumination time period. The controller 90 then exposes the imaging sensor 62 to capture an image of the barcode 40. The captured image of the barcode 40 is transferred to the controller 90 as imaging data. Such imaging data is digitally processed by the decoder in the controller 90 to decode the barcode. The information obtained from decoding the barcode 40 is then stored in the memory 94 or sent to other devices for further processing.

Figure 3:
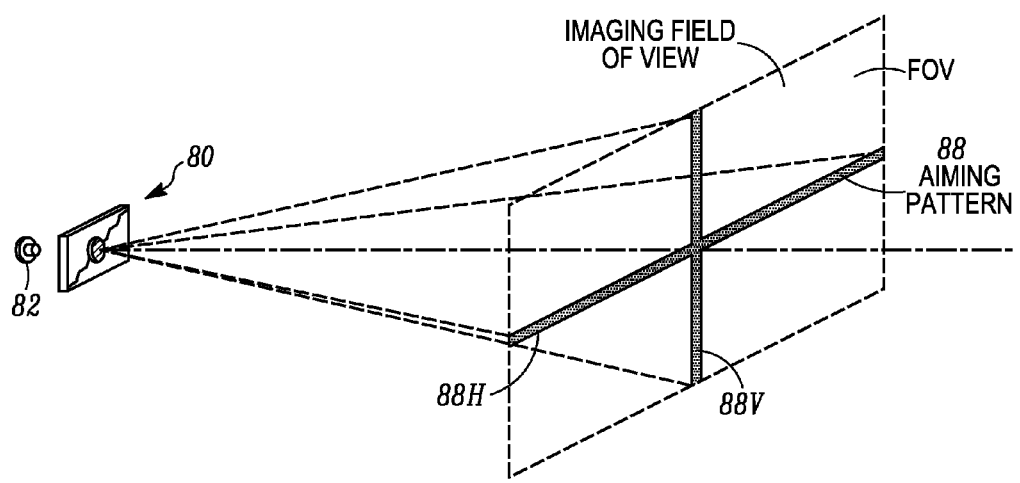
FIG. 3 shows that an aiming pattern is generated within the imaging field of view (FOV) when the visible light from the aiming light source is projected through the aiming pattern generating element in accordance with some embodiments.

Barcode imaging scanners typically project a bright aiming pattern (e.g., a dot, line, cross pattern, etc.) to assist the user in aiming the scanner at the barcode. When aimed properly, the aiming pattern will be projected onto the desired barcode. As shown in FIG. 3, an aiming pattern 88 can be generated within the imaging field of view (FOV) when the visible light from the aiming light source is projected through the aiming pattern generating element 80. In FIG. 3, the aiming pattern 88 is in the form of an aiming cross-wire that includes two lines of visible illumination: a horizontal line of visible illumination 88H and a vertical line of visible illumination 88V.

Figure 4:
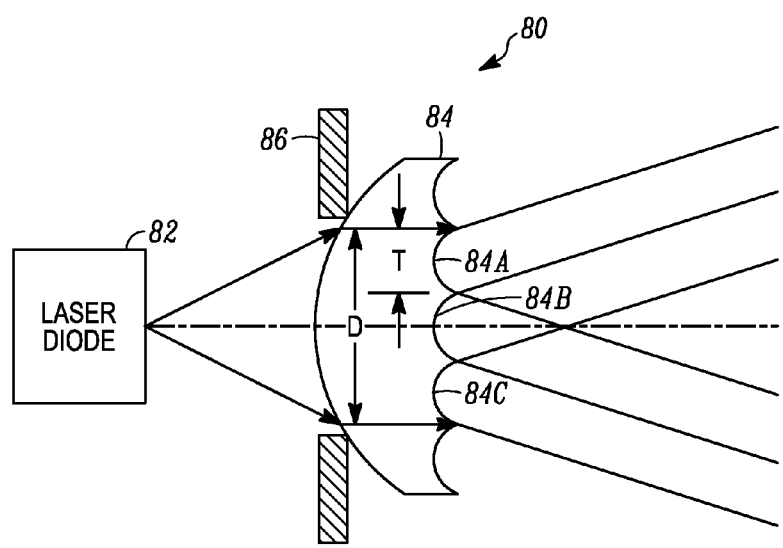
FIG. 4 shows that the aiming pattern generating element can include an aperture stop and an optical component in accordance with some embodiments.

In one implementation, as shown in FIG. 4, the aiming pattern generating element 80 includes an aperture stop 86 and an optical component 84. The optical component 84 in FIG. 4 is a refractive optical element (ROE). Specifically, in one implementation, the rear portion of the optical component 84 is formed with a plurality of refractive structures (e.g., 84A, 84B, 84C, . . . ) for refracting the light beam from the laser diode 82. There are many possible implementations of the optical component 84. Some implementations of the optical component 84—including the implementation as shown in FIG. 4—are described in more detail in U.S. Pat. No. 7,182,260, titled "Aiming light pattern generator in imaging readers for electro-optically reading indicia." The entire content U.S. Pat. No. 7,182,260 is hereby incorporated by reference. In some other embodiments, the optical component 84 in FIG. 4 can also be a diffractive optical element (DOE) that includes a plurality of interferometric elements for generating the aiming pattern by light interference. Some implementations of the diffractive optical element (DOE) are described in more detail in U.S. Pat. No. 6,060,722, which is hereby incorporated by reference in its entirety.

Figure 5:
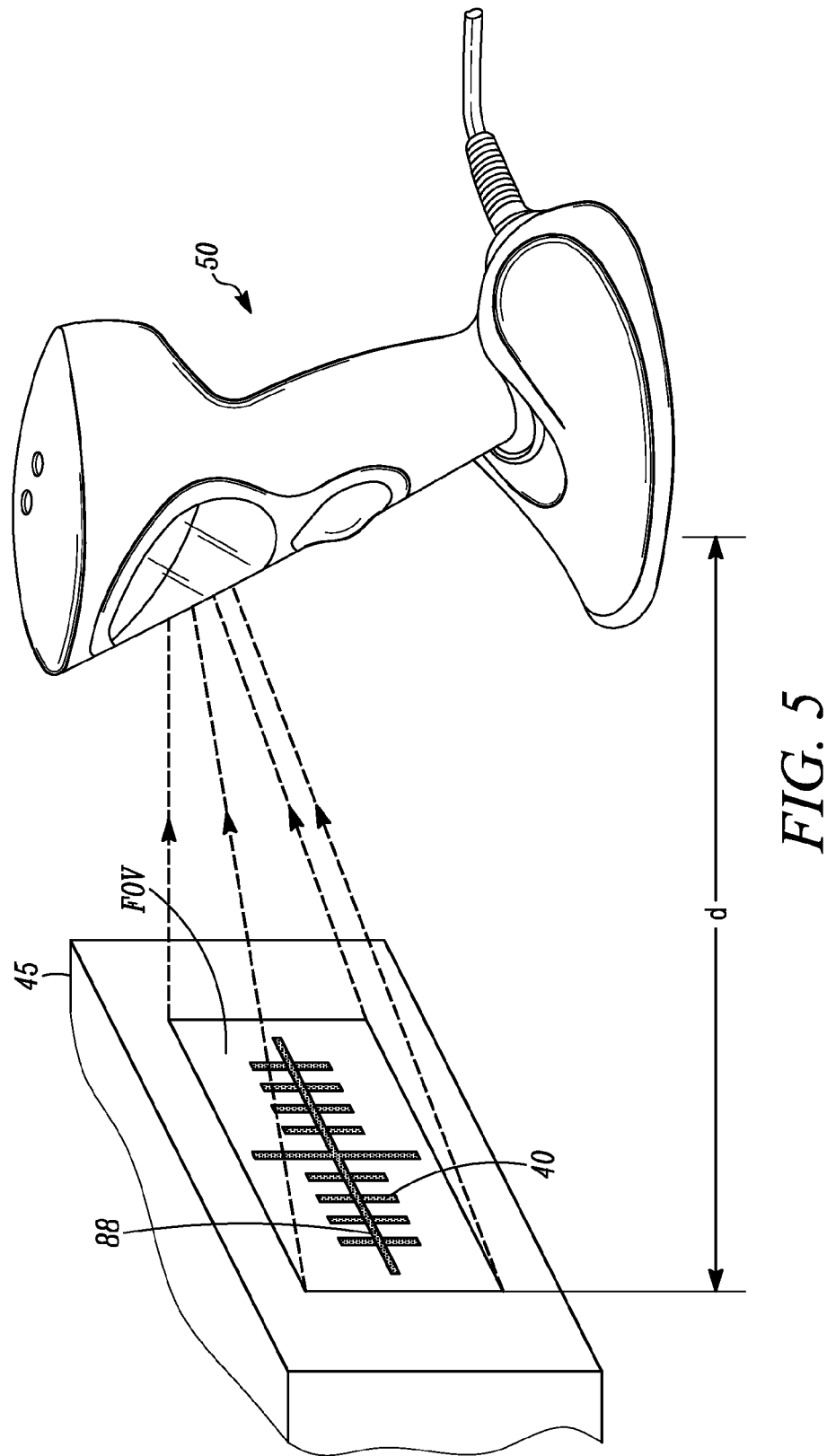
FIG. 5 shows that images of a barcode on the surface of a target object can captured with the imaging scanner.

FIG. 5 shows that images of a barcode 40 on the surface of a target object 45 can captured with the imaging scanner 50. The aiming pattern 88 can be projected on the surface of the target object 45 to indicate to the user where the center of the imager field of view is located. It is desirable to have the aiming pattern 88 well aligned with the FOV center of the imaging system. Typically an aiming system is located off axis of the imaging system therefore creating a parallax where the center of the imaging FOV and the aiming pattern 88 overlap well at a particular distance "d" only. At all other distances the aiming pattern is not centered relatively to the imaging FOV. It can prevent the user to align properly the imaging FOV and a barcode at certain distances and prevent it from capturing the entire image of the barcode which results in no decode. Therefore, it is desirable to have an optical arrangement in which the aiming system and the imaging system are aligned in such a way that the optical axis of the aiming system and the imaging system are coaxial with one another to eliminate the parallax effect.

Figure 6A:
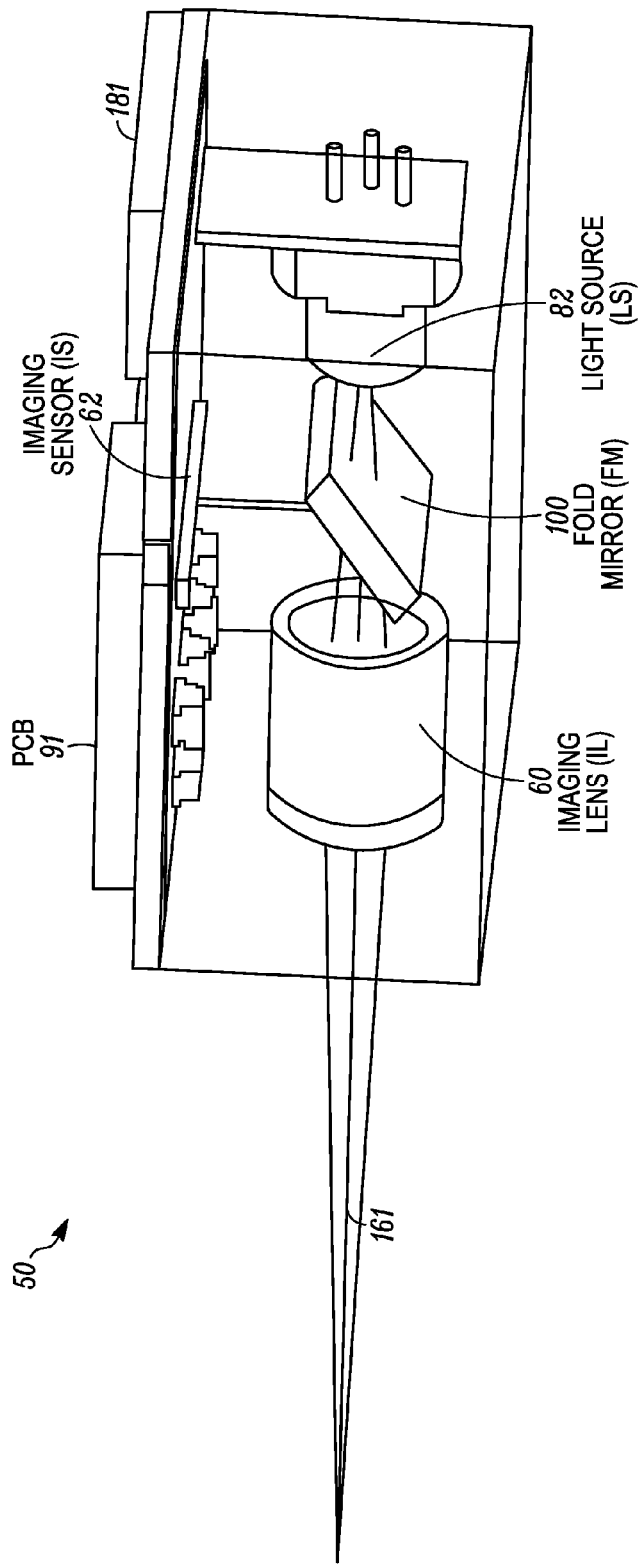
FIG. 6A and FIG. 6B are schematics of an optical arrangement in which the optical axis of the aiming system and the imaging system are coaxial with one another in accordance with some embodiments.
Figure 6B:
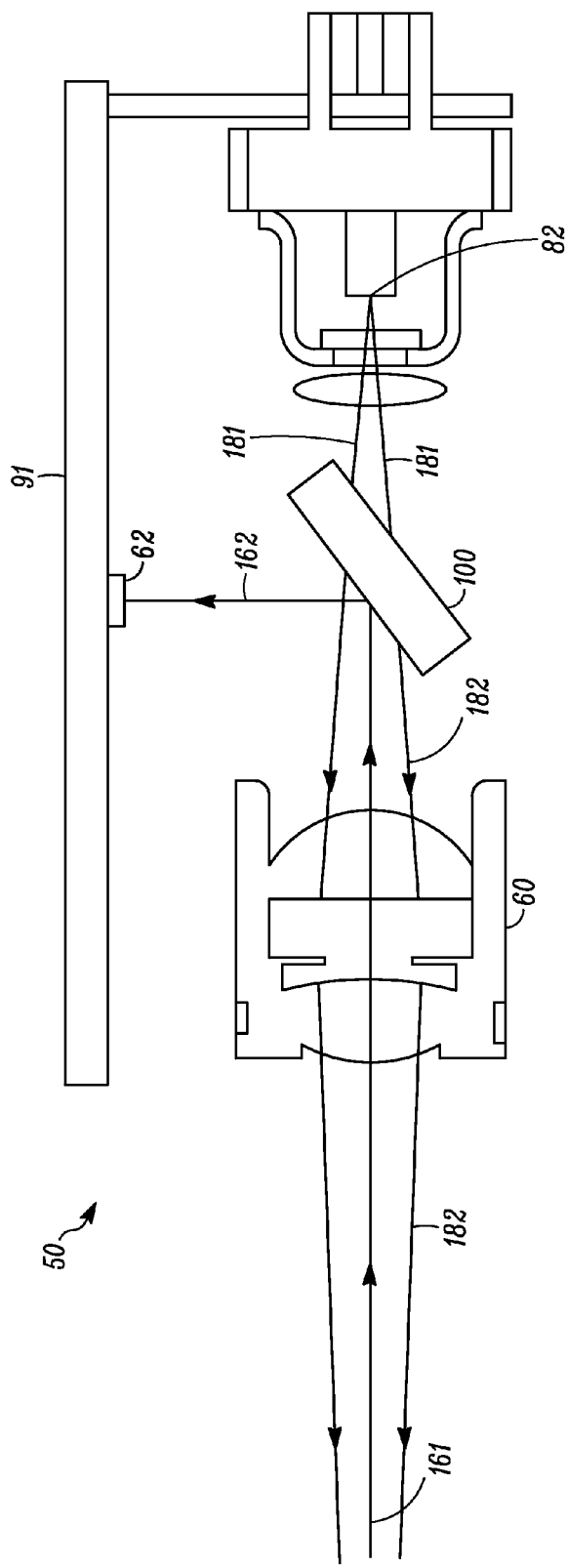

FIG. 6A and FIG. 6B are schematics of an optical arrangement in which the optical axis of the aiming system and the imaging system are coaxial with one another in accordance with some embodiments. The light from an illumination system of the imaging reader or ambient light illuminate an object of interest, for example, a barcode. Scattered light 161 from the object of interested follows the imaging optical path (IOP) and is reflected onto the imaging sensor (IS) 62 by the fold mirror (FM) as reflected light 162. In one embodiment, the imaging sensor 62 is a linear sensor of approximately 1500 pixels. The imaging sensor 62 is located at a conjugated distance of the imaging lens (IL) at a particular distance "d". The photosensitive elements in the imaging sensor 62 are aligned next to each other in an extended direction for detecting a one-dimensional barcode, and the extended direction is substantially perpendicular to the optical axis of the imaging lens (IL) 60. In some embodiments, the imaging sensor 62 can have photosensitive elements arranged in a two-dimensional matrix.

Figure 7:
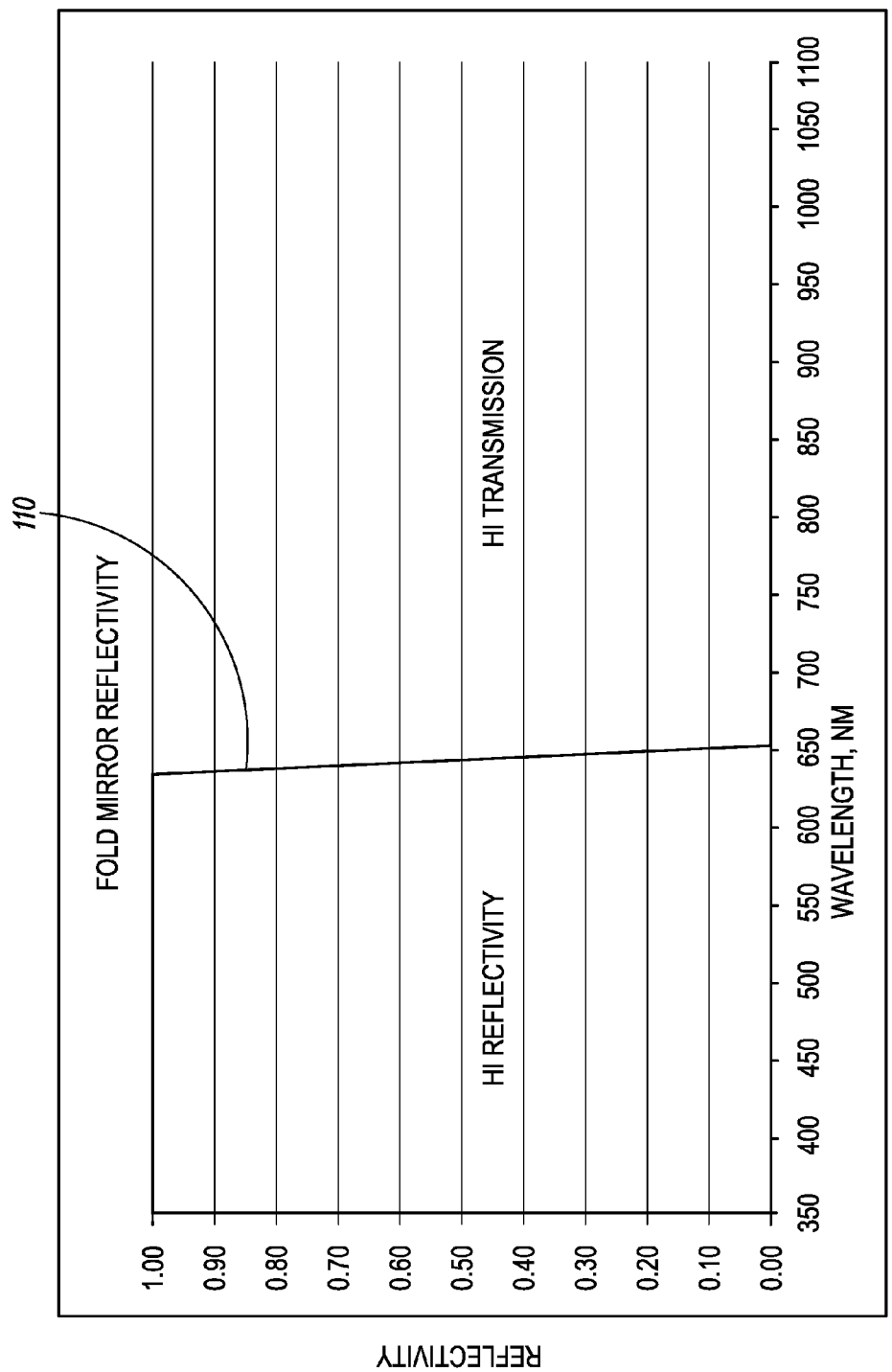
FIG. 7 is an example reflectivity curve of the fold mirror (FM) in accordance with some embodiments.

The fold mirror (FM) 100 can be a diachroic mirror. In one embodiment, the fold mirror (FM) 100 is a "cold" mirror which has a high reflectivity of about 90% within the visible spectrum of approximately 350-625 NM. The fold mirror (FM) 100 also has a high transmission of about 90% from 650-1100 NM. The folding mirror 100 can be coated with a dielectric coating which provides functional properties as described above. The fold mirror (FM) 100 folds the imaging optical path at approximately 90 degrees. Therefore, the coating can be optimized to work properly at approximately 45 degree incident angle. FIG. 7 is an example reflectivity curve 110 of the fold mirror (FM) 100 in accordance with some embodiments.

Figure 8:
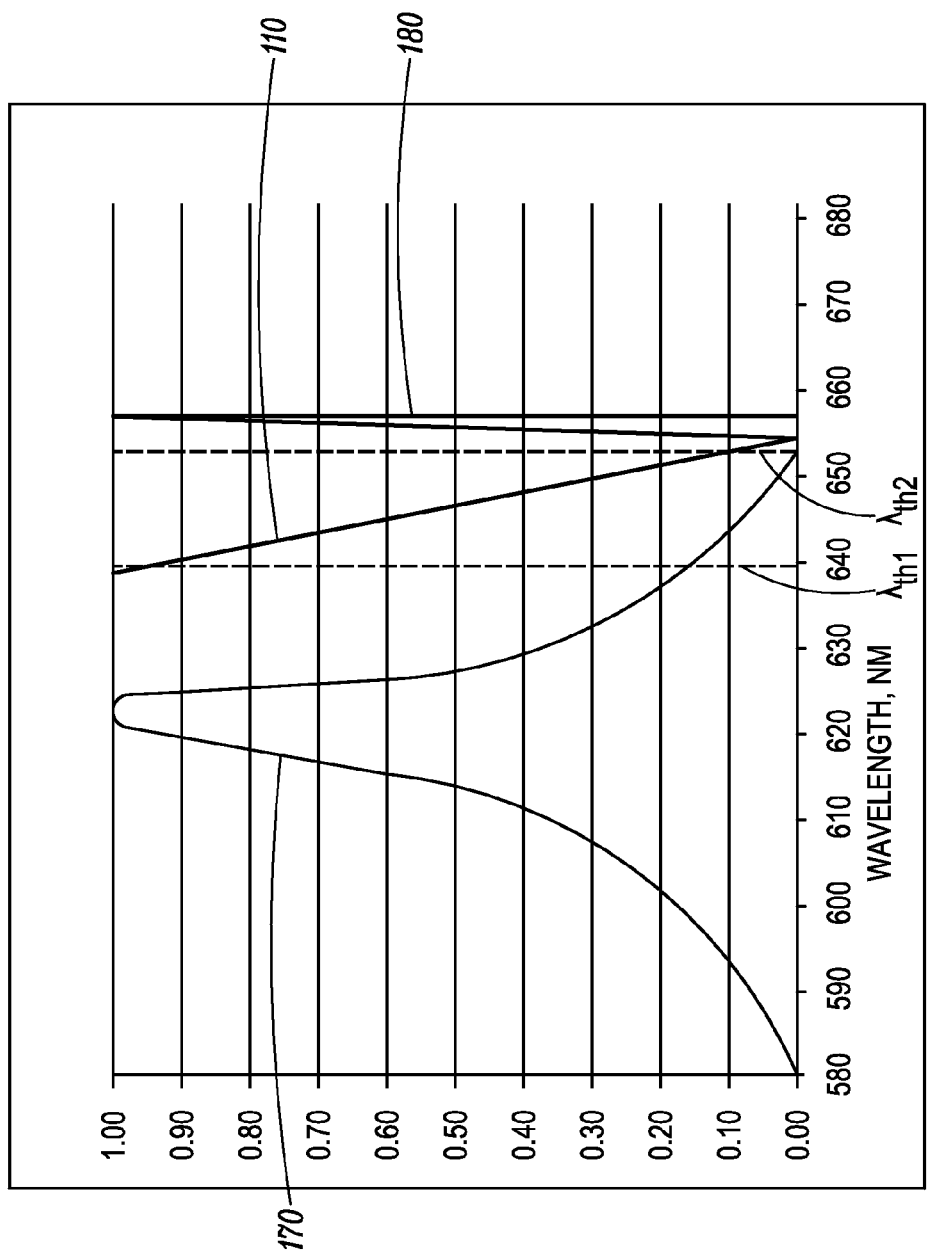
FIG. 8 shows an example reflectivity properties of the fold mirror that has a reflectivity of at least 90% below a first threshold wavelength and to have a transmission of at least 90% above a second threshold wavelength $\lambda_{th2}$.

As shown in FIG. 6A and FIG. 6B, the aiming system includes a light source (LS) 82. In one embodiment, the aiming light source 82 is a laser diode. The wavelength distribution 180 of the light source (LS) lies within the transmission bandwidth of the fold mirror (FM) 100, as shown in FIG. 8. In the example as shown in FIG. 8, the wavelength of the laser diode is approximately 655 NM.

As one can see in FIG. 6A and FIG. 6B, the light 181 from the light source (LS) 82 follows the aiming optical path (AOP). The light 181 impinges on the fold mirror (FM) 100 and passes through it with minimum power loss as light 182 and gets focused by the imaging lens (IL) 60 and projected towards the object of interests. The imaging optical path (IOP) and aiming optical path (AOP) are substantially overlapped and coaxial between the fold mirror (FM) and the imaging lens (IM) and object of interests.

The imaging scanner 50 may have its own internal illumination system. For example, as shown in FIG. 2, the internal illumination system of the imaging scanner 50 can include the illuminating lens arrangement 70 and the illumination light source 72. As shown in FIG. 8, the wavelength distributions 170 of the illumination light source 72 (for example, LEDs) are selected to be substantially within the high reflectivity bandwidth of the folding mirror 100. When the illumination light is projected towards the target object, the scattered light 161 from the target object may have the same wavelength distributions 170 as the illumination light source 72; therefore, the mirror (FM) 100 can reflects effectively the light 161 projected by the imaging lens (IM) 60 onto the imaging sensor (IS) 62 as light 162. In FIG. 8, the folding mirror 100 is configured to have a reflectivity of at least 90% below a first threshold wavelength $\lambda_{th1}$ and to have a transmission of at least 90% above a second threshold wavelength $\lambda_{th2}$. The visible light 181 from the aiming light source 82 is configured to have most of its power 180 carried by light with wavelength above the second threshold wavelength $\lambda_{th2}$, and the illumination light from the illumination light source 72 is configured to have most of its power 170 carried by light with wavelength below the first threshold wavelength $\lambda_{th1}$.

In some embodiments, usually it is desirable to filter our infrared (IR) ambient light from reaching the imaging sensor 62. The reflectivity of the cold mirror (FM) 100 is substantially low for the IR light and therefore acts like an IR filter for the imaging system. It eliminates the need of integrating an IR filter into the imaging lens or a separate filter in front of the imaging sensor (IS) 62.

In some embodiments, the imaging sensor (IS) 62 and light source (LS) 82 are located at approximately the same optical path distance from the imaging lens (IS) 60 and its principal planes. It allows keeping both the imaging sensor (IS) 62 and the light source (LS) 82 at the same conjugated distance which means that the imaging lens (IM) 60 projects sharp image of an object of interest onto the sensor (IS) 62 and in reverse it projects the light source (LS) 82 onto the object of interests as a sharp aiming dot or pattern.

In one embodiment, image acquisition occurs when the aiming light source (LS) 82 is not energized. The light source (LS) 82 is energized after the image acquisition is completed. It allows to avoid a potential stray light from the light source (LS) 82 from reaching the imaging sensor (IS) 62. In most embodiments, the image acquisition and aiming light sources activation is in sequence. In some embodiments, however, the image acquisition and aiming light sources activation can have some overlap time. Typically under bright ambient light conditions the exposure time of the sensor (IS) 82 is short. Therefore the aiming light source (IS) 82 can be energized for a longer period of time. It improves the visibility of the aiming pattern under the bright ambient light condition by allowing the light source to generate aiming light over a longer period of time.

Figure 9:
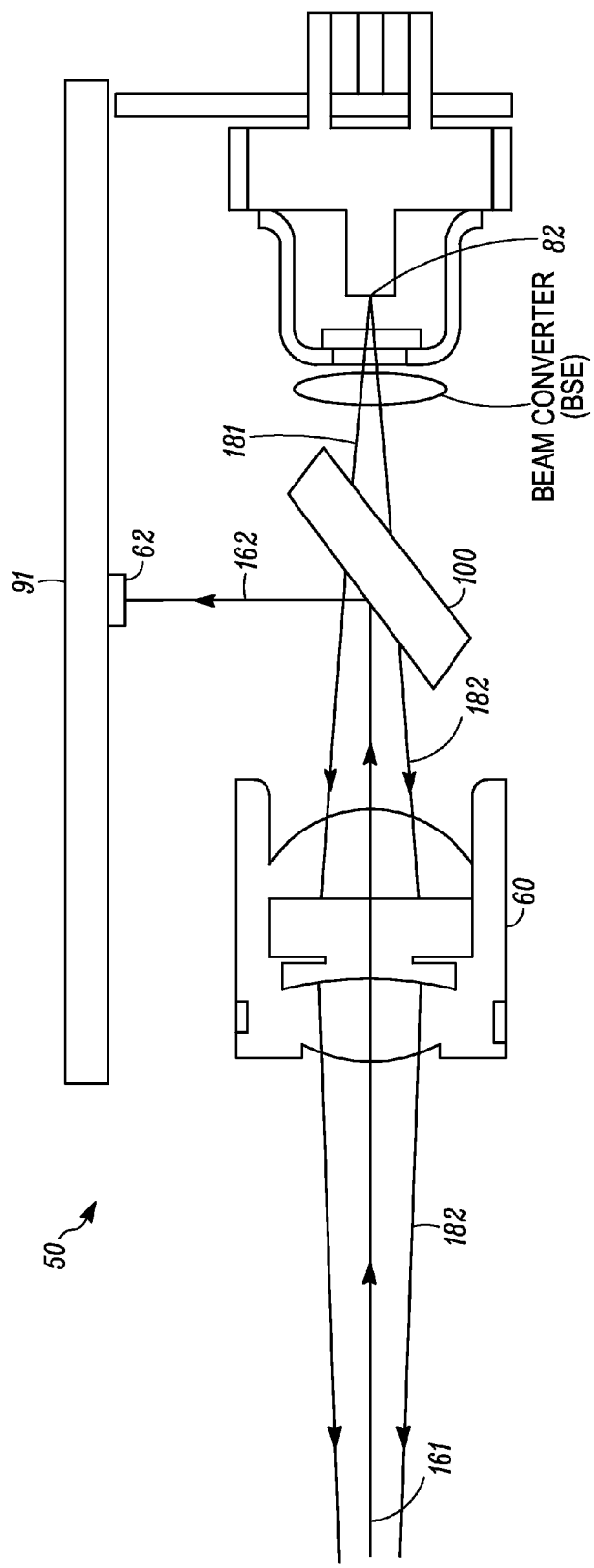
FIG. 9 shows that an auxiliary beam shaping element (BSE) can be placed in front of the light source (LS) to improve coupling efficiency between the light source (LS) and the imaging lens (IM) in accordance with some embodiments.

In some embodiments, as shown in FIG. 9, an auxiliary beam shaping element (BSE) can be placed in front of the light source (LS) 82 to improve coupling efficiency between the light source (LS) and the imaging lens (IM). In a preferred embodiment the light source is a laser diode. Typically laser diodes generate an elliptical spot profile, i.e. the vertical beam size is substantially larger than the horizontal. A beam reducing optical system (BSE) can be used to convert the outgoing beam to a desired size as shown in FIG. 9.

Figure 10:
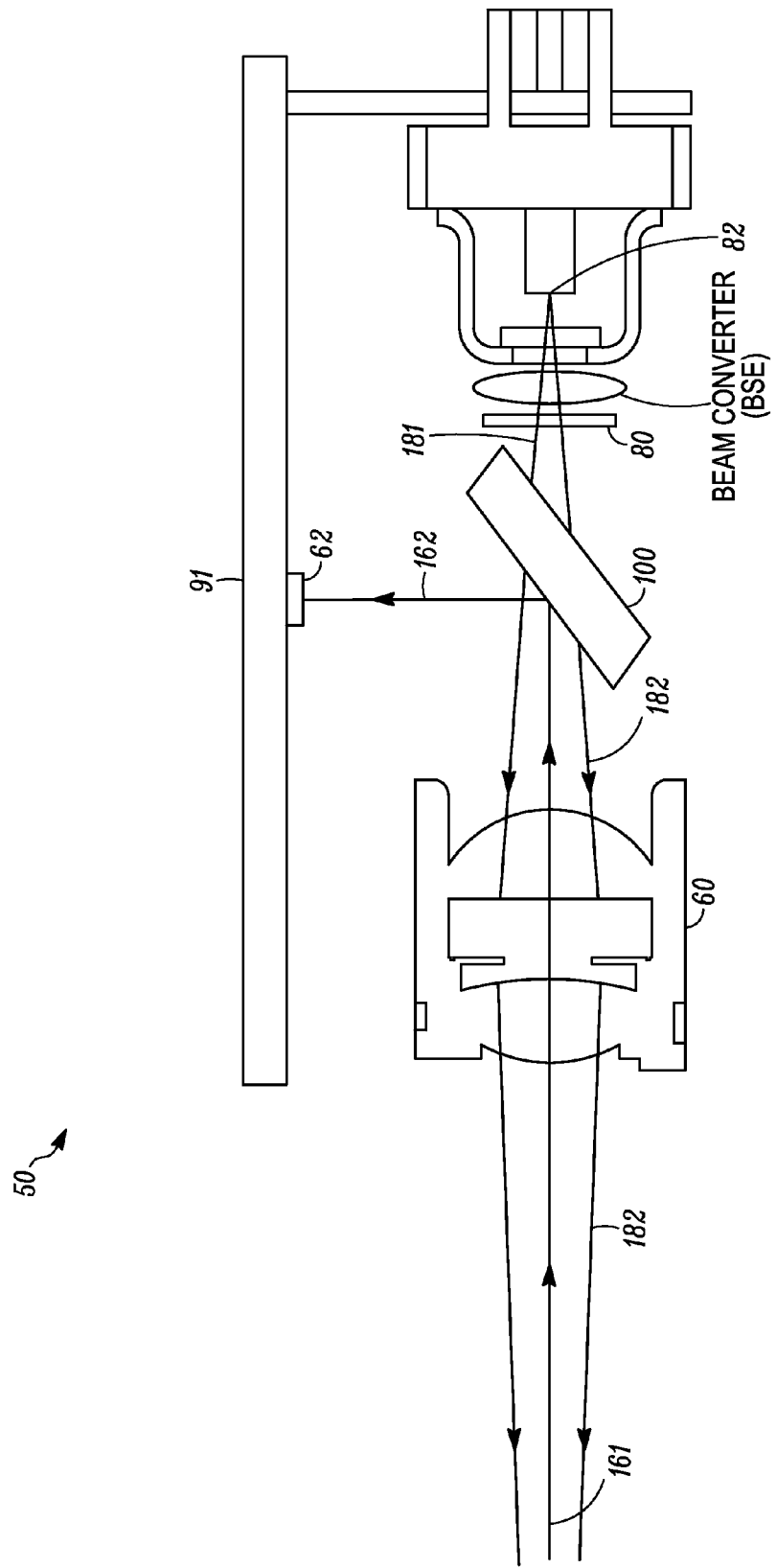
FIG. 10 shows that an auxiliary aiming pattern shaping element (APSE) can also be placed in front of the light source (LS) to generate an aiming pattern in accordance with some embodiments.

In some embodiments, as shown in FIG. 10, an auxiliary aiming pattern shaping element (APSE) 80 can also be placed in front of the light source (LS) 82 to generate an aiming pattern such as line, a circle, or other patterns. The aiming pattern shaping element (APSE) 80 can be a diffractive (DOE) or refractive (ROE) or absorbing or any other element which can manipulate the light distribution within the aiming pattern.

Figure 11:
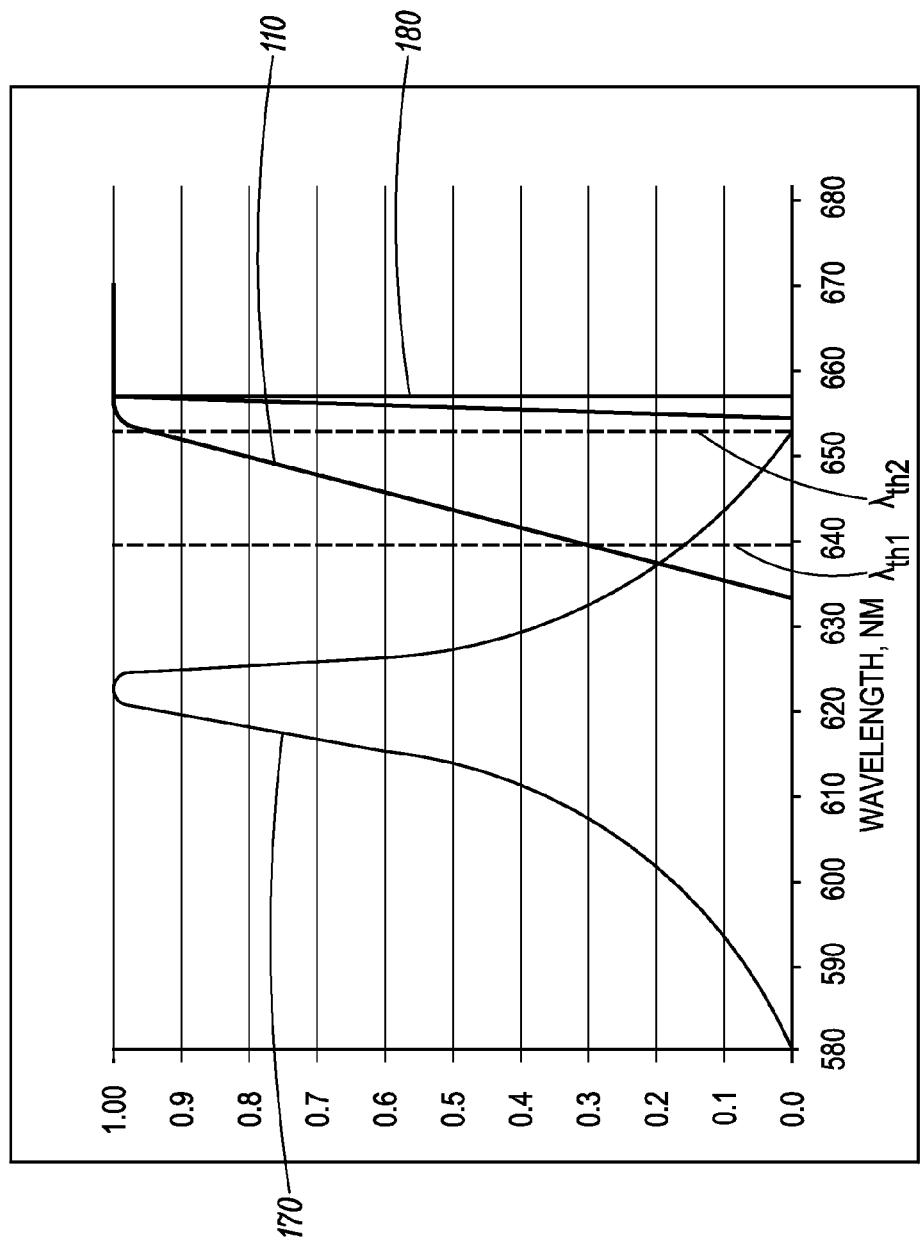
FIG. 11 shows an example reflectivity curve of the fold mirror that has a reflectivity of at least 90% above a second threshold wavelength and to have a transmission of at least 90% below a first threshold wavelength.

In some embodiments, the layout of the imaging sensor (IS) 62 and the light source (LS) 82 can be flipped around. In this case, the fold mirror (FM) has to be design in such a way to allow passing through the visible light and reflecting IR light and the light of the wavelength of the aiming light source. For example, the reflectivity curve 110 of the fold mirror (FM) 100 can have the general shape as shown in FIG. 11. In FIG. 11, the folding mirror 100 is configured to have a reflectivity of at least 90% above a second threshold wavelength $\lambda_{th2}$ and to have a transmission of at least 90% below a first threshold wavelength $\lambda_{th1}$. The illumination light from the illumination light source 72 is configured to have most of its power 170 carried by light with wavelength below the first threshold wavelength $\lambda_{th1}$, and the visible light from the aiming light source 82 is configured to have most of its power 180 carried by light with wavelength above the second threshold wavelength $\lambda_{th2}$.

In an imaging scanner 50, if the optical axis of the aiming system and the imaging system are designed to be coaxial with one another, the parallax between the imaging and the aiming system can be eliminated, which is beneficial for the user experience. In most of the designs described above, the imaging axis and the aiming axis are substantially overlapped and centered at all distances.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
an imaging lens arrangement having an optical axis;
an aiming light source configured to project visible light through the imaging lens arrangement to create a stationary aiming pattern on a target object;
an illumination light source operative to generate an illumination light that is motionlessly projected towards a barcode on the target object, wherein the illumination light source is different from the aiming light source;

an imaging sensor having an array of photosensitive elements configured to detect light from the target object through the imaging lens arrangement to capture an image of the barcode as imaging data when the illumination light is projected towards the barcode on the target object; and a folding mirror tilted with an angle between 30 to 60 degrees relative to the optical axis of the imaging lens arrangement, wherein the folding mirror is positioned both on the optical path from the imaging lens arrangement to the imaging sensor and on the optical path from the aiming light source to the imaging lens arrangement.

2. The apparatus of claim 1, wherein the folding mirror is tilted with an approximately 45-degrees angle relative to the optical axis of the imaging lens arrangement.

3. The apparatus of claim 1,
wherein the aiming light source is configured to project the visible light through the imaging lens arrangement during a first time period;
wherein the imaging sensor is configured to detect light from the target object through the imaging lens arrangement to create the imaging data during a second time period when the illumination light is projected towards the barcode on the target object; and
wherein the second time period is after the first time period.

4. The apparatus of claim 1, further comprising a controller configured for processing the imaging data to decode an image of the barcode.

5. The apparatus of claim 1, wherein the folding mirror is a dichroic mirror.

6. The apparatus of claim 1, wherein the visible light from the aiming light source is positioned near the optical axis of the imaging lens arrangement when transmitting through the imaging lens arrangement, and wherein the light from the target object projected on the imaging sensor is also positioned near the optical axis of the imaging lens arrangement when transmitting through the imaging lens arrangement.

7. The apparatus of claim 1, wherein the imaging sensor and the aiming light source are located from the imaging lens arrangement with optical path distances matching each other within 10%.

8. The apparatus of claim 1, further comprising at least one of a beam converter and an auxiliary aiming pattern shaping element positioned between the folding mirror and the aiming light source.

9. The apparatus of claim 1, wherein the photosensitive elements in the imaging sensor are aligned next to each other in an extended direction for detecting a one-dimensional barcode, wherein the extended direction is substantially perpendicular to the optical axis of the imaging lens arrangement.

10. The apparatus of claim 1,
wherein the folding mirror is configured to allow the visible light from the aiming light source to pass therethrough; and
wherein the folding mirror is further configured to allow the light from the target object, after passing through the imaging lens arrangement, to be reflected onto the imaging sensor.

11. The apparatus of claim 10, wherein the folding mirror is configured to allow at least 90% of the visible light from the aiming light source to pass through, and wherein the folding mirror is further configured to allow at least 90% of the light from the target object that has passed through the imaging lens arrangement to be reflected onto the imaging sensor.

12. The apparatus of claim 10, wherein the folding mirror is configured to have a reflectivity of at least 90% below a first threshold wavelength and to have a transmission of at least 90% above a second threshold wavelength, and wherein the visible light from the aiming light source is configured to have more than half of its power carried by light with wavelength above the second threshold wavelength, and the illumination light from the illumination light source is configured to have more than half of its power carried by light with wavelength below the first threshold wavelength.

13. The apparatus of claim 10, wherein the folding mirror is configured to have a reflectivity of at least 90% above a second threshold wavelength and to have a transmission of at least 90% below a first threshold wavelength, and wherein the visible light from the aiming light source is configured to have more than half of its power carried by light with wavelength below the first threshold wavelength, and the illumination light from the illumination light source is configured to have more than half of its power carried by light with wavelength above the second threshold wavelength.

14. The apparatus of claim 1,
wherein the folding mirror is configured to allow the light from the target object, after transmitting through the imaging lens arrangement, to pass therethrough; and
wherein the folding mirror is further configured to allow the visible light from the aiming light source be reflected into the imaging lens arrangement.

15. The apparatus of claim 14, wherein the folding mirror is configured to allow at least 90% of the light from the target object, after transmitting through the imaging lens arrangement, to pass therethrough, and wherein the folding mirror is further configured to allow at least 90% of the visible light from the aiming light source to be reflected onto the imaging sensor.

16. The apparatus of claim 14, wherein the folding mirror is configured to have a reflectivity of at least 90% below a first threshold wavelength and to have a transmission of at least 90% above a second threshold wavelength, and wherein the illumination light from the illumination light source is configured to have more than half of its power carried by light with wavelength above the second threshold wavelength, and the visible light from the aiming light source is configured to have more than half of its power carried by light with wavelength below the first threshold wavelength.

17. The apparatus of claim 14, wherein the folding mirror is configured to have a reflectivity of at least 90% above a second threshold wavelength and to have a transmission of at least 90% below a first threshold wavelength, and wherein the illumination light from the illumination light source is configured to have more than half of its power carried by light with wavelength below the first threshold wavelength, and the visible light from the aiming light source is configured to have more than half of its power carried by light with wavelength above the second threshold wavelength.

18. A method comprising:
transmitting visible light from an aiming light source through a folding mirror and through an imaging lens arrangement sequentially to project a stationary aiming pattern onto a target object, wherein the folding mirror is tilted relative to an optical axis of the imaging lens arrangement;
projecting an illumination light motionlessly from an illumination light source towards a barcode on the target object, wherein the illumination light source is different from the aiming light source;

transmitting light from the target object through the imaging lens arrangement to cause light from the target object being incident upon the folding mirror;

reflecting the light that is incident upon the folding mirror onto an imaging sensor having an array of photosensitive elements to capture an image of the barcode as imaging data; and processing the imaging data to decode an image of the barcode.

19. The method of claim 18, wherein the folding mirror is tilted with an approximately 45-degrees angle relative to the optical axis of the imaging lens arrangement.

20. The method of claim 18, wherein the folding mirror transmits at least 90% of the visible light from the aiming light source therethrough, and wherein the folding mirror reflects at least 90% of the light from the imaging lens arrangement onto the imaging sensor.

21. The method of claim 18, wherein said transmitting visible light comprises:

transmitting more than half of the visible light from the aiming light source through the folding mirror.

22. The method of claim 18, wherein said reflecting the light comprises:

reflecting more than half of the light that is incident upon the folding mirror onto the imaging sensor.

23. A method comprising:

reflecting visible light from an aiming light source into an imaging lens arrangement with a folding mirror to project a stationary aiming pattern onto a target object, wherein the folding mirror is tilted relative to an optical axis of the imaging lens arrangement;

projecting an illumination light motionlessly from an illumination light source towards a barcode on the target object, wherein the illumination light source is different from the aiming light source;

transmitting light from the target object through the imaging lens arrangement and through the folding mirror sequentially to cause light from the target object being incident upon an imaging sensor having an array of photosensitive elements to capture an image of the barcode as imaging data; and processing the imaging data to decode an image of the barcode.

24. The method of claim 23, wherein the folding mirror is tilted with an approximately 45-degrees angle relative to the optical axis of the imaging lens arrangement.

25. The method of claim 23, wherein the folding mirror reflects at least 90% of the visible light from the aiming light source into the imaging lens arrangement, and wherein the folding mirror transmits at least 90% of the light from the imaging lens arrangement therethrough to the imaging sensor.

26. The method of claim 23, wherein said reflecting visible light comprises:

reflecting more than half of the visible light from the aiming light source into the imaging lens arrangement.

27. The method of claim 23, wherein said transmitting light through the folding mirror comprises:

transmitting more than half of the light from the imaging lens arrangement through the folding mirror to the imaging sensor.

28. The apparatus of claim 1, wherein the stationary aiming pattern is a distributed stationary aiming pattern comprising light spots simultaneously illuminated by the aiming light source with the light spots being separated by more than a half of the horizontal dimension of a field of view of the imaging sensor.

* * * * *